US012322254B2

(12) United States Patent
Spiridonovs

(10) Patent No.: US 12,322,254 B2
(45) Date of Patent: Jun. 3, 2025

(54) METHOD OF OPERATING A GAMING SYSTEM

(71) Applicant: STROPUS LTD., Agioi Omologites Nicosia (CY)

(72) Inventor: Artjoms Spiridonovs, Agioi Omologites Nicosia (CY)

( * ) Notice: Subject to any disclaimer, the term of this patent is extended or adjusted under 35 U.S.C. 154(b) by 0 days.

(21) Appl. No.: 18/000,889

(22) PCT Filed: Feb. 2, 2022

(86) PCT No.: PCT/IB2022/050897
§ 371 (c)(1),
(2) Date: Dec. 6, 2022

(87) PCT Pub. No.: WO2022/238764
PCT Pub. Date: Nov. 17, 2022

(65) Prior Publication Data
US 2023/0245530 A1 Aug. 3, 2023

(51) Int. Cl.
*G07F 17/00* (2006.01)
*G07F 17/32* (2006.01)

(52) U.S. Cl.
CPC ...... *G07F 17/3267* (2013.01); *G07F 17/3211* (2013.01); *G07F 17/3262* (2013.01); *G07F 17/3288* (2013.01)

(58) Field of Classification Search
None
See application file for complete search history.

(56) References Cited

U.S. PATENT DOCUMENTS

| | | | | |
|---|---|---|---|---|
| 5,919,090 A * | 7/1999 | Mothwurf | G07F 17/32 | 463/25 |
| 6,568,682 B1 * | 5/2003 | Hogan | A63F 3/00157 | 463/13 |
| 6,837,494 B2 * | 1/2005 | Lee | A63F 3/00157 | 273/274 |
| 8,474,820 B2 * | 7/2013 | Walker | G07F 17/32 | 273/142 E |
| 2004/0038720 A1 * | 2/2004 | Valente | A63F 3/00157 | 463/11 |
| 2005/0170875 A1 * | 8/2005 | Snow | G07F 17/32 | 463/13 |
| 2005/0269783 A1 * | 12/2005 | Snow | A63F 3/00157 | 273/292 |

(Continued)

*Primary Examiner* — Paul A D'Agostino
(74) *Attorney, Agent, or Firm* — Patshegen IP; Moshe Pinchas

(57) ABSTRACT

The present invention relates to a method of operating a gaming system. The method comprises the following steps: placing a bet or bets on the betting grid; activating the bonus buy area having four side-bet areas; registering one of four side-bet areas selected by the player; applying a side-bet multiplier according to the registered side-bet area; closing the betting grid and the bonus buy area; selecting additional numbers to whom additional multipliers are applied; generating a winning number/-s; and pay-out of winning amount to the bet/-s of winning number/-s multiplied by the multiplier number. Addition of the bonus buy area provides increased action for the player while enticing the player to wager more creating increased gaming volume for an operator.

6 Claims, 7 Drawing Sheets

(56) References Cited

U.S. PATENT DOCUMENTS

| | | | | |
|---|---|---|---|---|
| 2006/0084505 | A1* | 4/2006 | Yoseloff | G07F 17/3211 463/42 |
| 2007/0135204 | A1* | 6/2007 | Nicely | G07F 17/322 463/17 |
| 2008/0258383 | A1* | 10/2008 | Sorge | G07F 17/322 273/142 E |
| 2010/0117299 | A1* | 5/2010 | Nicely | A63F 1/00 273/287 |
| 2010/0144419 | A1* | 6/2010 | Miltenberger | A63F 5/007 273/142 E |
| 2016/0042599 | A1* | 2/2016 | Toohey | G07F 17/3241 463/25 |
| 2017/0316653 | A1* | 11/2017 | Cranford | G07F 17/3255 |
| 2018/0311568 | A1* | 11/2018 | Katz | G07F 17/323 |

* cited by examiner

METHOD OF OPERATING A GAMING SYSTEM

FIELD OF THE INVENTION

The present invention relates to a method of operating a gaming system.

BACKGROUND OF THE INVENTION

The prior art discloses various gaming systems. One such gaming system is disclosed in the US patent application publication US2009/0061981. It describes a game visually recognizable as roulette. The system comprises a roulette and two or more stations where participants place bets and perform other gaming functions. The roulette wheel spins, as a simulation of roulette. The winning roulette ball is displayed as a simulated ball dropping on the roulette spindle.

The US patent publication No. U.S. Pat. No. 8,444,470 discloses a video-based multi-ball roulette gaming system that includes a main/primary roulette wheel having a number of ball pockets with betting marks and a circular runway for rotating multiple graphical game balls within the primary roulette wheel. The system permits a player to pay and play multiple balls in order to maximize the action and winning chances with respect to a player. A secondary multiplier bonus wheel rotates within the vicinity of the primary roulette wheel in order to provide multiplied potential win for the player when configured with, for example, a bonus-wheel roulette gaming system and/or method.

Another prior art documents such as US patent publication No. U.S. Pat. No. 8,474,820 discloses a roulette table that allows players to make customized betting selections and customize the layout of the betting options that appear on the player station of the roulette table. Players may add, delete, or modify the appearance of betting options through a user interface so that the players may more readily indicate desired wagers.

SUMMARY OF THE INVENTION

The present invention is a method of operating a gaming system. The gaming system may be selected from the group of the following games: a roulette; a bingo, a blackjack, a baccarat, dices, a money wheel.

The method is specially designed for gaming online. The interface of the gaming system comprises a game table area. Depending on a game type the game table area displays necessary game features. For example, in embodiment of the roulette, the game table are displays a roulette wheel. The interface comprises a betting chip area, where chips are presented according to a respective pay-in by a player. The interface comprises a betting grid positioned between the game table area and the betting chip area. The betting grid displays a number in each grid cell, on which chips from the betting chip area are placed by the player.

The system is characterized in that the interface further comprises a bonus buy area. The bonus buy are comprises four side-bet areas. Each side-bet area has different level of volatility and respective multiplier. The player chooses the level of volatility by selecting one of four side-bet areas. Table 1 indicates levels of a side-bet areas, maximum number of bets to be multiplied, and maximum multiplier for each side-bet area.

TABLE 1

Maximum numbers and multipliers depending on a level of a side-bet area

| Level of a side-bet area | Maximum numbers | Maximum multiplier |
|---|---|---|
| Level 1 of the side-bet area | 5 | x150 |
| Level 2 of the side-bet area | 10 | x350 |
| Level 3 of the side-bet area | 20 | x500 |
| Level 4 of the side-bet area | 20 | x1000 |

Depending on the selected side-bet area or a level of side-bet area, a commission is added on top of the bet made by the player. The higher the volatility, the higher the commission. Table 2 indicates commission depending on the level of the side-bet area and volatility.

TABLE 2

Commissions and volatility depending on a level of a side-bet area

| Level of a side-bet area | Commission | Volatility |
|---|---|---|
| Level 1 of the side-bet area | 0.2 | Low |
| Level 2 of the side-bet area | 0.5 | Medium |
| Level 3 of the side-bet area | 1.0 | High |
| Level 4 of the side-bet area | 0.5 | High |

Minimum amount of multiplier numbers for all levels is 1. Minimum multiplier for all levels is ×50. Base pay-outs stay the same as in the regular games.

The method of operating the gaming system further comprises the following steps:

- allowing the player to place a bet or bets on the betting grid using the chips from the betting chip area;
- activating the bonus buy area once the chips are placed on the betting grid;
- registering one of four side-bet areas or levels of side-bet areas selected by the player;
- applying a side-bet multiplier according to the registered side-bet area to all chips of the player placed on the betting grid;
- closing the betting grid and the bonus buy area so that no more bets can be made by the player;
- selecting additional numbers in the grid cells of the betting grid to whom additional multipliers are applied;
- generating a winning number/-s and displaying thereof on the game table area; and
- pay-out of winning amount to the bet/-s of winning number/-s multiplied by the multiplier number according to the selected ide-bet area of the bonus buy area.

Only straight up bets apply to the bonus buy area. Accumulated straight up bets provide the total bet amount available for boost in the bonus buy area. After the bets are closed, the multipliers are revealed. Random number of multipliers with random pay-out are assigned in the selected range of the level of the side-bet area. And this is applied to random numbers on the betting grid. The player receives a multiplier pay-out if the winning number is the same where the player placed the bet and multiplier was applied.

Addition of the bonus buy area provides increased action for the player while enticing the player to wager more creating increased gaming volume for an operator.

BRIEF DESCRIPTION OF THE DRAWINGS

The drawings illustrate generally, by way of example, but not by way of limitation, various embodiments of the invention.

DETAILED DESCRIPTION OF THE EMBODIMENTS

The preferred embodiments of the invention are now described with reference to the figures to illustrate objectives, advantages, and efficiency of the present invention.

Figure 1:
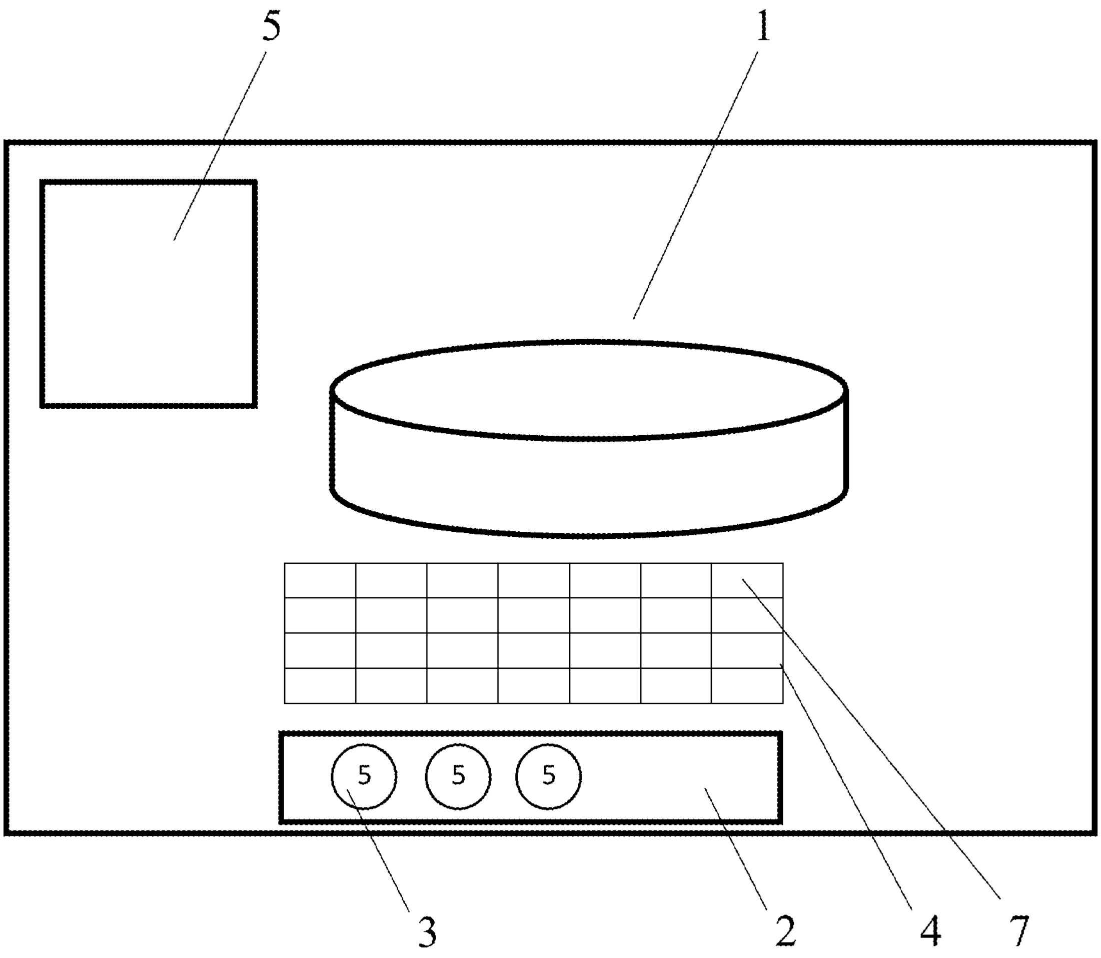
FIG. 1 illustrates a game layout comprising a roulette table area (1).
Figure 2:
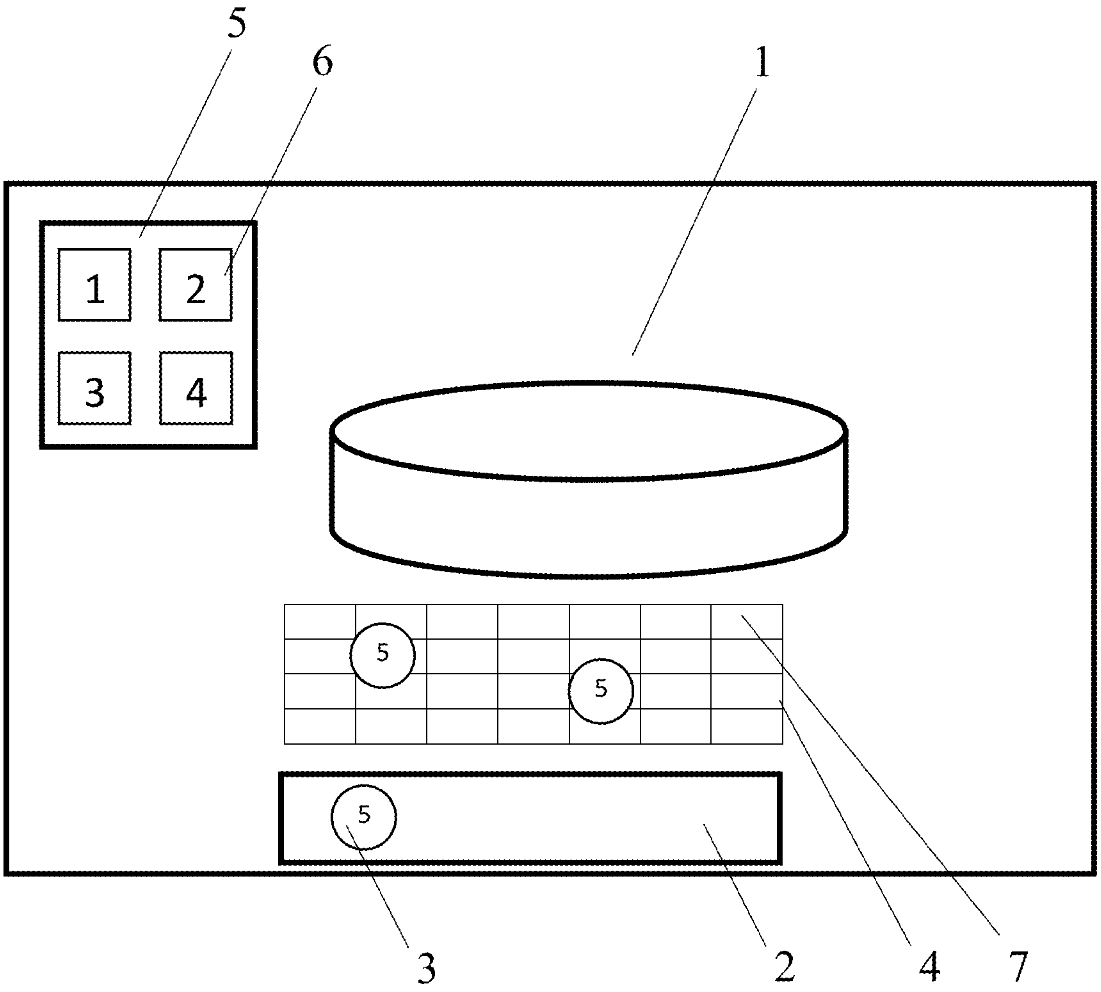
FIG. 2 illustrated a game layout where a player has placed chips (3) on a betting grid (4).
Figure 3:
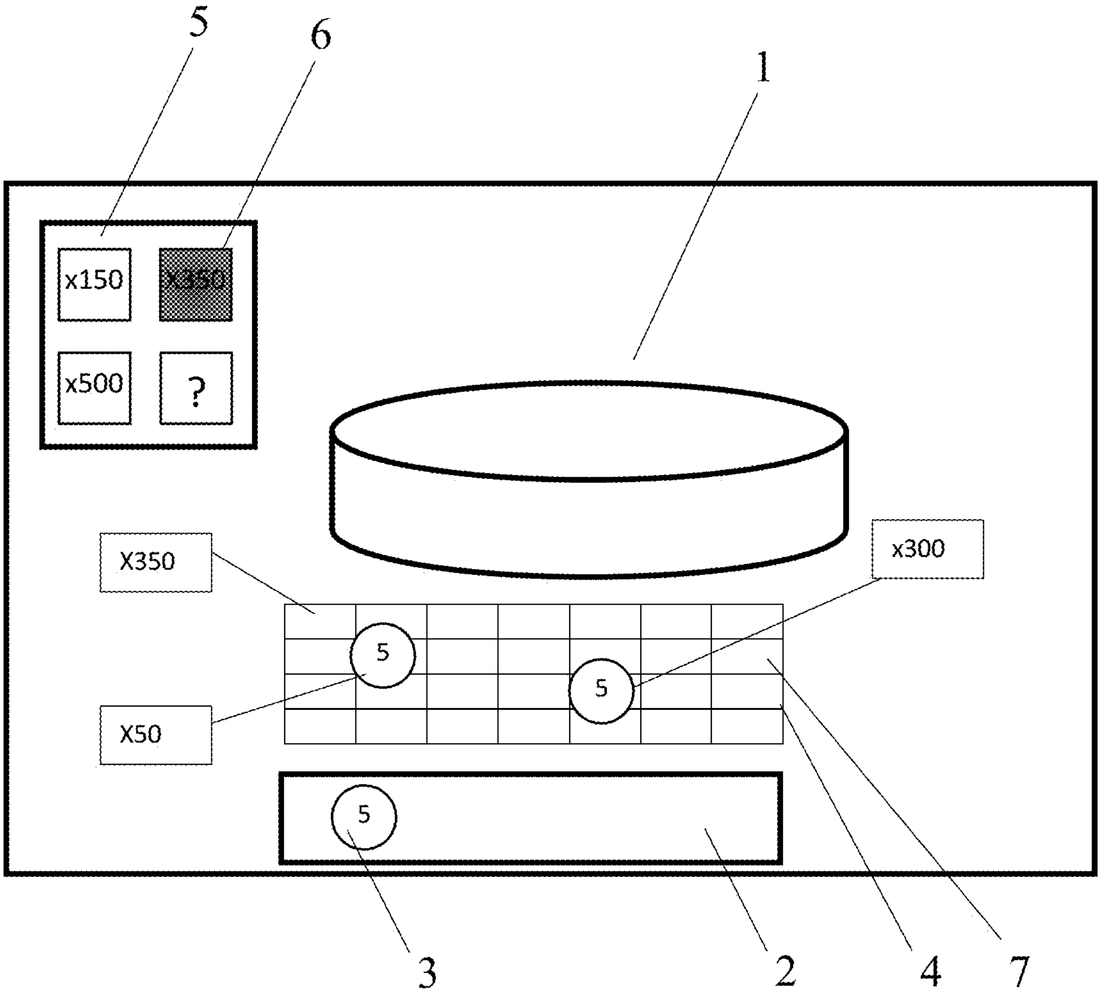
FIG. 3 illustrates a game layout where a bonus buy area (5) is activated and multipliers are applied to the chips (3) and grid cells (7) of a betting grid (4).

FIGS. 1 to 3 schematically illustrates a game layout comprising a roulette table area (1). The game layout comprises a game table area (1) having a roulette wheel, betting chip area (2) with chips (3) presented according to a respective pay-in by a player, a betting grid (4) divided in grid cells (7), and a bonus buy area (5) with four side-bet areas (6) that are displayed only when the bet or bets are placed on the betting grid (4) using the chips (3) from the betting chip area (2).

FIG. 1 illustrates initial state of the game layout. FIG. 2 illustrates the game layout when the player has placed bets on the betting grid (4) using the chips (3) from the betting chip area (2). In this example, a value of each chip (3) placed on the betting grid (4) is 5. FIG. 2 also illustrates an activation of the bonus buy area (5) once the chips (3) are placed on the betting grid (4). FIG. 3 illustrates a selection of one of four side-bet areas (6), which has multiplier of 350. This selection is performed by the player. The selected side-bet area (6) is registered by the system and the system applies side-bet multipliers according to the registered side-bet area (6) to all chips (3) of the player placed on the betting grid (4). The multiplier is also applied also to some non-selected/non-bet grid cells (7). After those steps a winning number is generated. A pay-out of winning amount to the bet of winning number multiplied by the multiplier number at that exact bet. In FIG. 3, if the winning number is on the bet where the value of the chip (3) is 5 and indicated multiplier is 50, then the pay-out is 5×50=250. In the same FIG. 3, if the winning number is on the bet where the value of the chip (3) is 5 and indicated multiplier is 300, then the pay-out is 5×300=1500.

Figure 4:
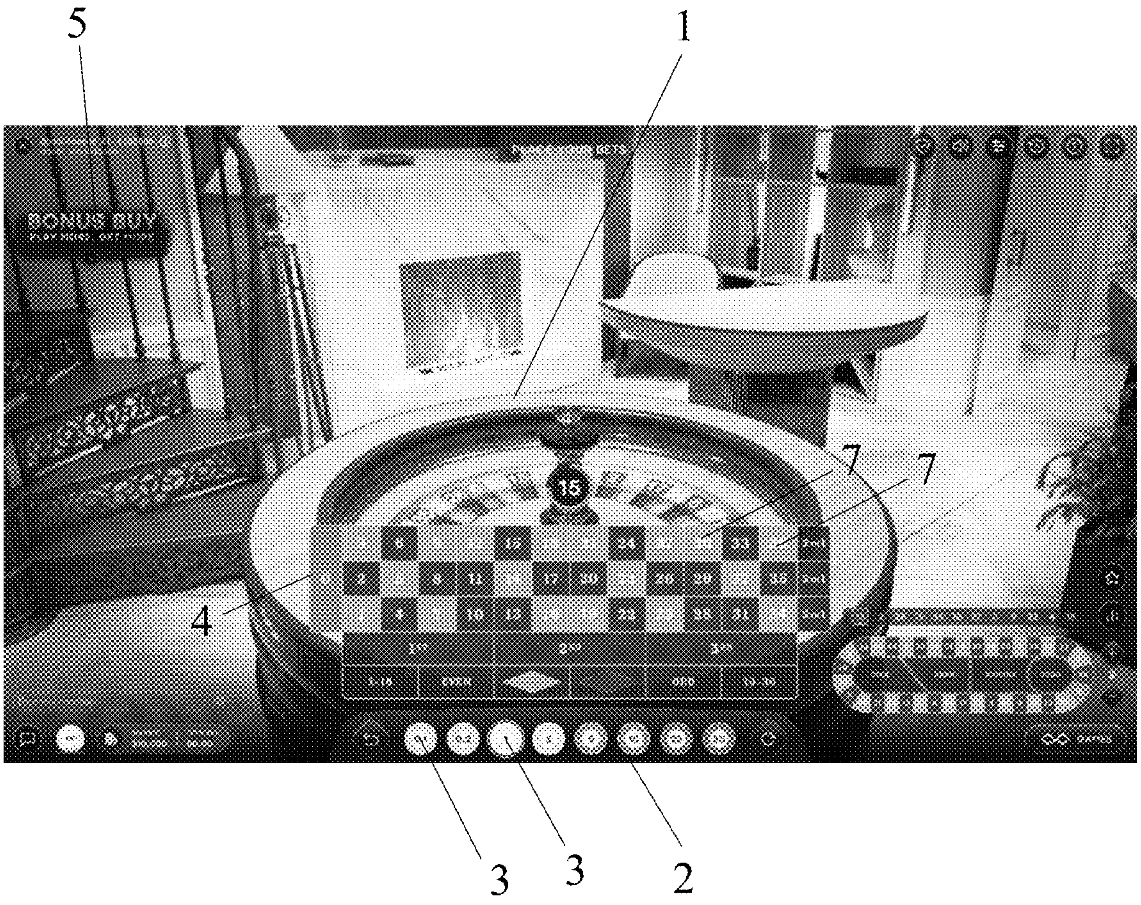
FIG. 4 illustrates one embodiment of the present invention for of a roulette game.
Figure 5:
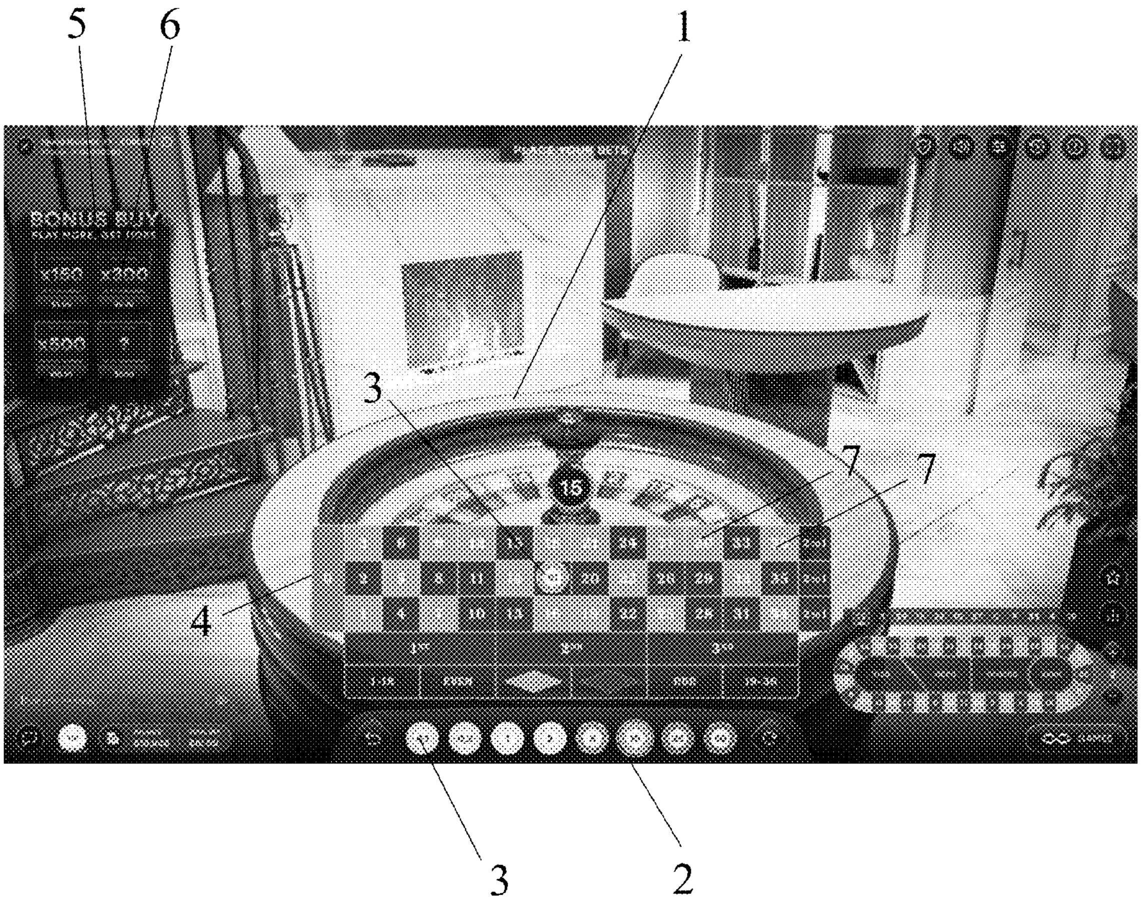
FIG. 5 illustrates the roulette game as seen in FIG. 4, where chips (3) are placed on a betting grid (4) and a bonus buy area (5) is activated.
Figure 6:
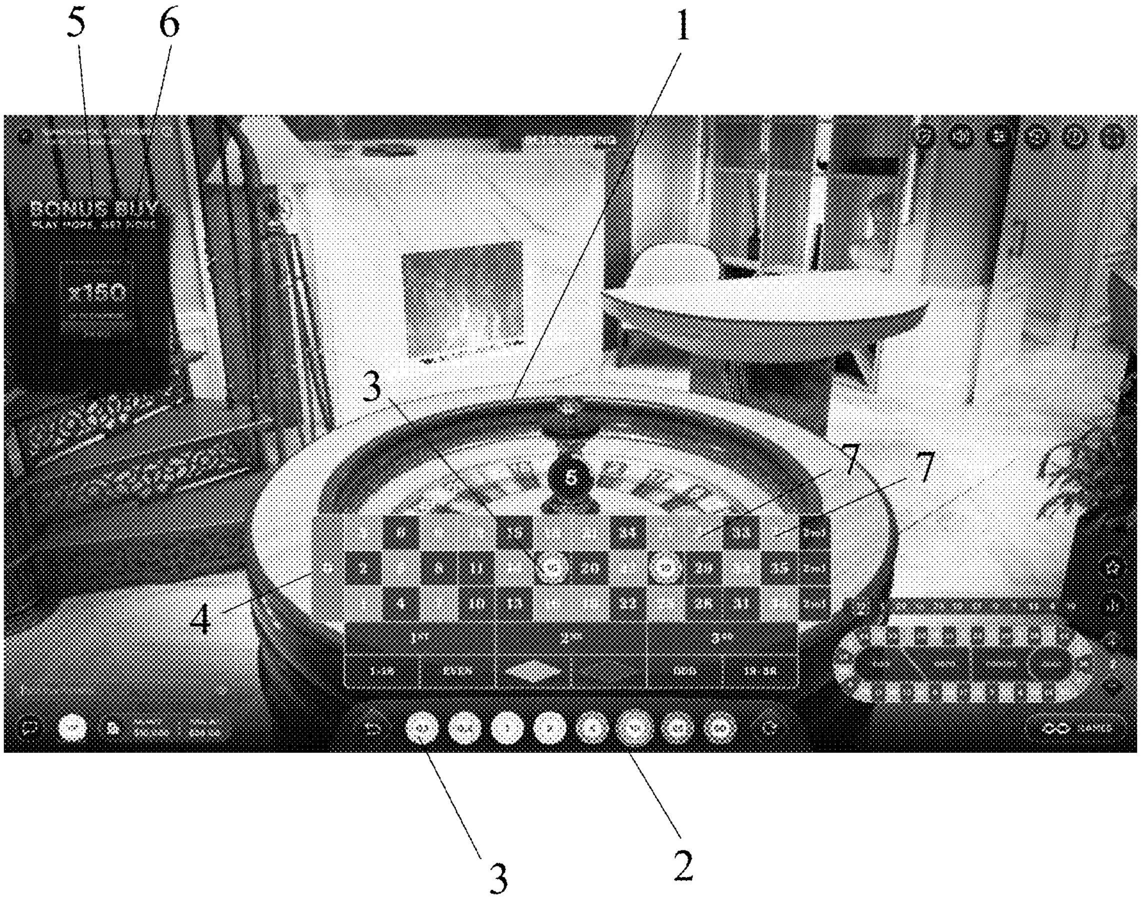
FIG. 6 illustrates the roulette game as seen in FIGS. 4 and 5, where a selected side-bet area (6) of the bonus buy area (5) by the player is displayed.
Figure 7:
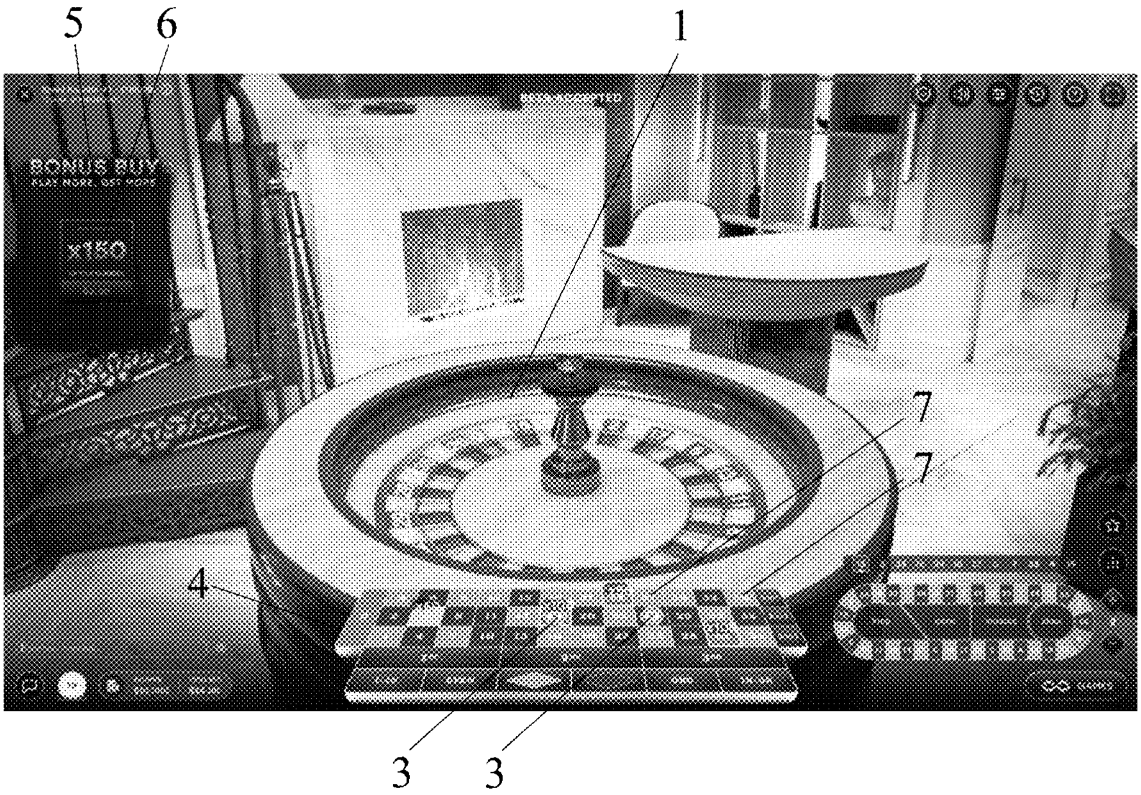
FIG. 7 illustrates the roulette game as seen in FIGS. 4 to 6, where multipliers are displayed by the system according to a selected side-bet area (6) of the bonus buy area (5) and to selected additional numbers on the betting grid (4).

FIGS. 4 to 7. illustrates a game layout as it would be seen on a display of a user device may it be desktop computer, laptop, tablet or cell phone. FIG. 4 in its initial state. FIG. 5 illustrates the game layout when the player has placed bet on the betting grid (4) using the chips (3) from the betting chip area (2). In this example, a value of each chip (3) placed on the betting grid (4) is 10. The bonus buy are (5) is also displayed. FIG. 6 illustrates additional placement of the chips (3) on the betting grid (4) and selection of one of four side-bet areas (6), which has multiplier of 150. FIG. 7 illustrates multipliers displayed on the betting grid (4) after all bets are finished or accepted and the system is ready to generate a winning number.

While the invention may be susceptible to various modifications and alternative forms, specific embodiments of which have been shown by way of example in the figures and have been described in detail herein, it should be understood that the invention is not intended to be limited to the particular forms disclosed. Rather, the invention includes all modifications, equivalents, and alternatives falling within the scope of the invention as defined by the following claims.

The invention claimed is:

1. A method of operating a gaming system, wherein the method comprising:

a) displaying a game table area (1);

b) displaying a betting chip area (2), wherein chips (3) are presented according to a respective pay-in by a player;

c) displaying a betting grid (4) comprising a number in each grid cell (7), on which the chips (3) from the betting chip area (2) are placed by the player; and d) displaying a bonus buy area (5) comprising four side-bet areas (6), wherein a first side-bet area (6) comprises a maximum multiplier of 150, a second side-bet area (6) comprises a maximum multiplier of 350; a third side-bet area (6) comprises a maximum multiplier of 500, and a forth side-bet area (6) comprises a maximum multiplier of 1000, and wherein the smallest possible randomly generated multiplier number is not less than 50;

the method further comprising the following steps:

e) allowing the player to place a bet or bets on the betting grid (4) using the chips (3) from the betting chip area (2);

f) activating the bonus buy area (5) once the chips (3) are placed on the betting grid (4);

g) registering one of four side-bet areas (6) selected by the player;

h) applying a side-bet multiplier according to the registered side-bet area (6) to all chips (3) of the player placed on the betting grid (4), i) closing the betting grid (4) and the bonus buy area (5) so that no more bets can be made by the player;

j) selecting additional numbers in the grid cells (7) of the betting grid (4) to whom additional multipliers are applied;

k) generating a winning number/-s and displaying thereof on the game table area (1);

l) pay-out of winning amount to the bet/-s of winning number/-s multiplied by the multiplier number according to the selected side-bet area (6) of the bonus buy area (5).

2. The method according to claim 1, characterized in that a commission for the first side-bet area (6) is 0.2 from sum of the chips (3) placed on the betting grid (4) by the player.

3. The method according to claim 1, characterized in that a commission for the second side-bet area (6) is 0.5 from sum of the chips (3) placed on the betting grid (4) by the player.

4. The method according to claim 1, characterized in that a commission for the third side-bet area (6) is 1 from sum of the chips (3) placed on the betting grid (4) by the player.

5. The method according to claim 1, characterized in that a commission for the forth side-bet area (6) 0.5 from sum of the chips (3) placed on the betting grid (4) by the player.

6. The method according to claim 1, characterized in that the bonus buy area (5) is activated for 15 to 30 seconds, preferably for 15 to 18 seconds.

* * * * *